United States Patent
Yamasaki et al.

(10) Patent No.: US 10,293,415 B2
(45) Date of Patent: May 21, 2019

(54) CUTTING TOOL AND CUTTING METHOD

(71) Applicants: Nagoya Institute of Technology, Nagoya-shi, Aichi (JP); SUMITOMO ELECTRIC INDUSTRIES, LTD., Osaka (JP); DMG MORI CO., LTD., Yamatokoriyama-shi, Nara (JP); Mitsubishi Heavy Industries Aero Engines, Ltd., Aichi (JP)

(72) Inventors: Makoto Yamasaki, Tokyo (JP); Shiro Nagami, Tokyo (JP); Junichi Marui, Tokyo (JP); Yoshiki Nishioka, Tokyo (JP); Fumihiro Itoigawa, Nagoya (JP); Kiichi Meguro, Tokyo (JP); Yohei Oda, Yamatokoriyama (JP)

(73) Assignees: NAGOYA INSTITUTE OF TECHNOLGY, Aichi (JP); SUMITOMO ELECTRIC INDUSTRIES, LTD., Osaka-Shi (JP); DMG MORI CO., LTD., Nara (JP); Mitsubishi Heavy Industries Aero Engines, Ltd., Aichi (JP)

( * ) Notice: Subject to any disclaimer, the term of this patent is extended or adjusted under 35 U.S.C. 154(b) by 0 days.

(21) Appl. No.: 15/458,133

(22) Filed: Mar. 14, 2017

(65) Prior Publication Data
US 2017/0266739 A1     Sep. 21, 2017

(30) Foreign Application Priority Data
Mar. 15, 2016 (JP) .................... 2016-051272

(51) Int. Cl.
*B23C 5/10* (2006.01)

(52) U.S. Cl.
CPC ........ *B23C 5/10* (2013.01); *B23C 2210/0442* (2013.01); *B23C 2210/28* (2013.01);
(Continued)

(58) Field of Classification Search
CPC .......... B23C 2210/28; B23C 2210/323; B23C 2210/326; B23C 2210/32; B23C 5/18; B23C 5/10
See application file for complete search history.

(56) References Cited

U.S. PATENT DOCUMENTS 4,212,568 A * 7/1980 Minicozzi ................ B23C 5/10
                                                              407/53
4,721,421 A * 1/1988 Klinger .................... B23C 5/10
                                                              407/116
(Continued)

FOREIGN PATENT DOCUMENTS

FR      2034984 A1 * 12/1970 ............... B23C 5/04
GB       672117 A  *  5/1952 ............... B23C 5/04
(Continued)

OTHER PUBLICATIONS

English translation of FR 2034984, Dec. 1970.*
(Continued)

*Primary Examiner* — Alan Snyder
(74) *Attorney, Agent, or Firm* — Hauptman Ham, LLP

(57) ABSTRACT

A shaft portion and a blade portion provided on a side surface of the shaft portion are included, and the blade portion includes cutting blades arranged in a plurality of lines on a side surface of the shaft portion along a peripheral direction, and arranged in a plurality of stages in an extending direction of a shaft center of the shaft portion in each line. Further, the cutting blade has a radial-direction clearance angle, a tip end-side clearance angle, and a base end-side clearance angle.

6 Claims, 5 Drawing Sheets

(52) U.S. Cl.
CPC ...... *B23C 2222/16* (2013.01); *B23C 2222/64* (2013.01); *B23C 2226/125* (2013.01); *B23C 2226/18* (2013.01); *B23C 2226/31* (2013.01)

(56) References Cited

U.S. PATENT DOCUMENTS

| | | | | |
|---|---|---|---|---|
| 7,399,147 | B1* | 7/2008 | VanDyke, Jr. | B23C 5/003 407/53 |
| 2010/0215447 | A1* | 8/2010 | Davis | B23C 5/10 407/115 |
| 2010/0226726 | A1* | 9/2010 | Strasmann | B23C 5/003 407/54 |
| 2010/0310329 | A1* | 12/2010 | Harif | B23B 27/045 408/1 R |
| 2011/0033251 | A1* | 2/2011 | Davis | B23C 5/10 407/114 |
| 2012/0020749 | A1* | 1/2012 | Maeda | B23C 5/003 407/42 |
| 2014/0356083 | A1* | 12/2014 | Budda | B23C 5/10 407/54 |

FOREIGN PATENT DOCUMENTS

| | | |
|---|---|---|
| JP | 2003-53671 A | 2/2003 |
| JP | 2012-206197 A | 10/2012 |

OTHER PUBLICATIONS

Yuki Terasaka et al., "Suppression of tool wear by extremely short-duration cutting", Mechanical Engineering Journal, Issued Oct. 14, 2015, p. 1-8, vol. 2, No. 6 (2015), The Japan Society of Mechanical Engineers Internet:<URL: https://www.jstage.jst.go.jp/article/mej/2/6/2 15-00348/ pdf>.

* cited by examiner

CUTTING TOOL AND CUTTING METHOD

CROSS-REFERENCE TO RELATED APPLICATIONS

This application claims priority from Japanese Application No. 2016-051272, filed on Mar. 15, 2016, the contents of which are incorporated by reference herein in its entirety.

FIELD

The present invention relates to a cutting tool.

BACKGROUND

Conventionally, a grindstone with a shaft described in Patent Literature 1 has the objective to improve accuracy in finishing iron-based castings, especially, in surface processing and chamfering in slotting, for example. In the grindstone with a shaft, abrasive grain layers are respectively formed on a side surface and an end surface of cylindrical base metal provided in a linked manner to a tip end side of a shaft attached to a drive shaft of a rotary machine, and a diamond sintered body chip as an abrasion resistant member is fixed with a brazing material to a portion close to an outer periphery of the abrasive grain layer on the end surface.

Further, conventionally, an end mill with nicks illustrated in Patent Literature 2 has the objective to achieve extension of tool life by preventing easy occurrence of chipping and the like in a specific nick even if rotation trajectories of nicks overlap when forming nicks in the end mill having a portion where an interval between peripheral blades adjacent in a peripheral direction is different, for example. In the end mill with nicks, a plurality of rows of the peripheral blades twisted in a spiral manner is formed in an outer periphery of a tip end portion of an end mill main body rotated around a shaft line. A plurality of nicks is formed in the peripheral blades such that the nicks are shifted in a shaft line direction between the peripheral blades adjacent in the peripheral direction. At least some of the peripheral blades adjacent in the peripheral direction, of the plurality of rows of peripheral blades, have a portion where the interval in the peripheral direction between the peripheral blades is different, and in the portion where the interval in the peripheral direction is different, pitches in the shaft line direction of the nicks adjacent in the shaft direction, of the peripheral blades adjacent in the peripheral direction, are equal.

CITATION LIST

Patent Literature

Patent Literature 1: JP 2003-053671 A
Patent Literature 2: JP 2012-206197 A

SUMMARY

Technical Problem

In the grindstone with a shaft described in Patent Literature 1, diamond grains or cubic boron nitride (CBN) is typically used in machining of iron-based castings or aluminum castings as general material. However, in machining of a difficult-to-machine material such as a nickel-based alloy, the temperature of the grains easily rises and easily reaches a graphitization temperature (about 600° C.) of the diamond grains, for example. Therefore, the diamond grains are not suitable for use as a tool. Further, the CBN grains are very expensive, and thus the cost becomes a problem as a tool. Meanwhile, by providing the nicks described in Patent Literature 2, machining can be performed with smaller cutting resistance in higher feed condition. However, as described above, the temperature of the tool blade edge becomes higher in the difficult-to-machine material than in the general material. Therefore, setting high machining efficiency is difficult and the tool life becomes short, and thus frequent replacement of the tool is required.

To improve the machining efficiency of the difficult-to-machine material, a cutting speed is increased or a feed amount is increased. However, thermal abrasion of the blade edge of the tool is increased and the tool life is significantly decreased if the cutting speed is increased, and the resistance of the blade edge of the tool is increased and the tool is more likely to be chipped if the feed amount is increased. On the other hand, to improve the tool life in machining of the difficult-to-machine material, the cutting speed is decreased or the feed amount is decreased. However, the machining efficiency is decreased.

The present invention solves the above-described problems, and an objective is to provide a cutting tool and a cutting method that can improve a tool life while improving machining efficiency in machining a difficult-to-machine material.

Solution to Problem

To achieve the above-described objective, a cutting tool of the present invention includes a shaft portion, and a blade portion provided on a side surface of the shaft portion. The blade portion includes cutting blades arranged in a plurality of lines on the side surface of the shaft portion along a peripheral direction, the cutting blades being arranged in a plurality of stages in an extending direction of a shaft center of the shaft portion in each line, and the cutting blade has a radial-direction clearance angle inclined inward in a radial direction from a blade edge with respect to a tangential line of the side surface of the shaft portion, a tip end-side clearance angle made such that a tip end-side surface facing a tip end side in the extending direction of the shaft center of the shaft portion is inclined from the blade edge to a base end side with respect to the peripheral direction, and a base end-side clearance angle made such that a base end-side surface facing the base end side in the extending direction of the shaft center of the shaft portion is inclined from the blade edge to the tip end side with respect to the peripheral direction.

According to this cutting tool, the cutting blades, each of which has the radial-direction clearance angle, the tip end-side clearance angle, and the base end-side clearance angle, are arranged in the plurality of lines on the side surface of the shaft portion along the peripheral direction, and arranged in the plurality of stages in the extending direction of the shaft center of the shaft portion in each line. Therefore, a cutting amount with the cutting blades can be increased in cutting, and thermal abrasion and resistance caused in the cutting blades can be decreased with the clearance angles. In addition, the fine cutting blades are independently arranged on the shaft portion. Therefore, cooling and lubrication with a cutting fluid are facilitated, compared with a periphery of the cutting blades. As a result, the tool life can be improved while the machining efficiency can be improved in machining a difficult-to-machine material.

Further, in the cutting tool of the present invention, the number of stages A per unit length of the cutting blade falls within a range of $A=\{(L1+d)\times \cos\gamma\}/H=$ from 0.3 to 7.0 stages/mm, both inclusive, where a machining height of a material to be machined is H, a blade length of the cutting blade is L1, a torsion angle is γ, and a blade groove width on the same torsion line is d.

According to this cutting tool, by defining the number of stages A of the cutting blades with respect to the set machining height H of the material to be machined, the number of stages A of the cutting blades for remarkably obtaining effect to increase the cutting amount with the cutting blades and to decrease the thermal abrasion and resistance caused in the cutting blades can be set in cutting the material to be machined having the set machining height H.

Further, in the cutting tool of the present invention, the number of lines B of the cutting blades falls within a range of $B=360/\theta$ or more, where a rotating speed of the shaft portion is V, a cutting arc length of one blade is L2, an angle made by rotation of the shaft portion when $L2/V<1.0\times 10^{-3}$ is θ.

According to this cutting tool, by defining the number of lines B of the cutting blades with respect to the rotating speed V of the shaft portion and the cutting arc length L2 of one blade, the number of lines B of the cutting blades for remarkably obtaining the effect to decrease the thermal abrasion and resistance caused in the cutting blades can be set in cutting the material to be machined at the rotating speed V of the shaft portion with the cutting arc length L2 of one blade.

Further, in the cutting tool of the present invention, in the cutting blade, the radial-direction clearance angle is from 3 to 30 degrees, both inclusive, the tip end-side clearance angle is from 3 to 15 degrees, both inclusive, and the base end-side clearance angle is from 3 to 15 degrees, both inclusive.

According to this cutting tool, by defining the radial-direction clearance angle, the tip end-side clearance angle, and the base end-side clearance angle, the effect to decrease the thermal abrasion and resistance caused in the cutting blades can be remarkably obtained in cutting the material to be machined.

Further, in the cutting tool of the present invention, in the cutting blade, a blade length L1 of the blade edge is from 0.1 to 3.0 mm, both inclusive.

According to this cutting tool, by defining the blade length L1 of the cutting blade, the effect to decrease the thermal abrasion and resistance caused in the cutting blades can be remarkably obtained. Further, a hydrostatic pressure of a central portion of the blade length L1 in the blade edge at the time of cutting can be base material strength of the blade portion or less, and effect to decrease damage caused from the center of the cutting blade can be remarkably obtained.

Further, in the cutting tool of the present invention, in the cutting blade, an effective rake angle αe is from 20 to 40 degrees, both inclusive.

When machining the difficult-to-machine material, the blade edge needs to be prevented from being chipped due to cutting resistance while securing sharpness. Therefore, by setting the effective rake angle αe formed by a rake angle β and a torsion angle γ to fall within the range from 20 to 40 degrees, both inclusive, both of the sharpness and the blade edge strength can be obtained.

Further, in the cutting tool of the present invention, a ratio of a cutting arc length L2 of one blade and a rotating speed V of the shaft portion is $L2/V=1.0\times 10^{-3}$ or less.

Chattering vibration is more likely to occur if the cutting blade of the cutting tool is deeply cut into the material to be machined, and thus the tool cutting depth cannot be set to be large and the machining efficiency is not high in general cutting tools. If the number of rotation of the tool is increased to solve this problem, thermal damage of the tool is significantly developed due to cutting heat associated with an increase in the cutting speed. Meanwhile, according to the cutting tool of the present invention, the number of lines of the cutting blades is larger than the general tools. Therefore, the tool cutting depth can be set to be large in a sufficiently large area in a stable area of the chattering vibration without changing the number of rotation of the tool (cutting speed), and effect to improve the machining efficiency while improving the tool life can be remarkably obtained.

Further, in the cutting tool of the present invention, the stages of the cutting blades are arranged to shift in the extending direction of the shaft center in each line of the cutting blades arranged along the peripheral direction of the shaft portion.

According to this cutting tool, a gap is caused in the extending direction of the shaft center between the stages when the cutting blades are provided in the plurality of stages in one line. This gap decreases the thermal abrasion and resistance caused in the cutting blades and thus contributes to improvement of the tool life. However, the gap portion cannot perform machining. Therefore, by shifting and arranging the stages of the cutting blades in the extending direction of the shaft center in each line, the cutting blade of another line can be provided in the position of the gap in the peripheral direction. As a result, the cutting machining can be continuously performed in the extending direction of the shaft center by rotation of the shaft portion. Therefore, the machining efficiency can be improved. Note that it is favorable to set overlap of the cutting blades between a previous line and a next line to be 0.01 mm or more to remarkably obtain the above-described effect.

To achieve the above-described objective, a cutting method using a cutting tool of the present invention includes a shaft portion, and a blade portion provided on a side surface of the shaft portion, the blade portion including cutting blades arranged in a plurality of lines on the side surface of the shaft portion along a peripheral direction, the cutting blades being arranged in a plurality of stages in an extending direction of a shaft center of the shaft portion in each line, the cutting blade having a radial-direction clearance angle inclined inward in a radial direction from a blade edge with respect to a tangential line of the side surface of the shaft portion, a tip end-side clearance angle made such that a tip end-side surface facing a tip end side in the extending direction of the shaft center of the shaft portion is inclined from the blade edge to a base end side with respect to the peripheral direction, and a base end-side clearance angle made such that a base end-side surface facing the base end side in the extending direction of the shaft center of the shaft portion is inclined from the blade edge to the tip end side with respect to the peripheral direction. The cutting blades are provided in a plurality of stages in the extending direction of the shaft center of the shaft portion within a range of a set machining height of a material to be machined.

According to this cutting method, the cutting blades, each of which has the radial-direction clearance angle, the tip end-side clearance angle, and the base end-side clearance angle, are arranged in the plurality of lines on the side surface of the shaft portion along the peripheral direction and are arranged in the plurality of stages in the extending direction of the shaft center of the shaft portion in each line, and are provided in a plurality of stages within the range of the set machining height of the material to be machined. Therefore, the cutting amount with the cutting blades can be increased in cutting, and the thermal abrasion and resistance caused in the cutting blades can be decreased with the clearance angles. In addition, the fine cutting blades are independently arranged on the shaft portion. Therefore, cooling and lubrication with a cutting fluid are facilitated, compared with a periphery of the cutting blades. As a result, the tool life can be improved while the machining efficiency can be improved in machining the difficult-to-machine material.

Further, in the cutting method of the present invention, a ratio of a rotating speed V of the shaft portion and a cutting arc length L2 of one blade is set to $L2/V<1.0\times10^{-3}$.

According to this cutting method, the chattering vibration is more likely to occur if the cutting blade of the cutting tool is deeply cut into the material to be machined. Therefore, in the general cutting tools, the tool cutting depth cannot be set to be large, and the machining efficiency is not high. If the number of rotation of the tool is increased to solve this problem, the thermal damage of the tool is significantly developed due to the cutting heat associated with an increase in the cutting speed. Meanwhile, according to the cutting tool of the present invention, the number of lines of the cutting blades is larger than the general tools. Therefore, the tool cutting depth can be set to be large in a sufficiently large area in a stable area of the chattering vibration without changing the number of rotation of the tool (cutting speed), and the effect to improve the machining efficiency while improving the tool life can be remarkably obtained.

Further, in the cutting method of the present invention, the number of lines B of the cutting blades is set in a range of $B=360/\theta$ or more, where an angle made by rotation of the shaft portion is $\theta$.

According to this cutting method, by defining the number of lines B of the cutting blades with respect to the rotating speed V of the shaft portion and the cutting arc length L2 of one blade, the effect to decrease the thermal abrasion and resistance caused in the cutting blades can be remarkably obtained in cutting the material to be machined at the rotating speed V of the shaft portion with the cutting arc length L2 of one blade.

Advantageous Effects of Invention

According to the present invention, the tool life can be improved while the machining efficiency can be improved in machining the difficult-to-machine material.

DESCRIPTION OF EMBODIMENTS

Hereinafter, an embodiment according to the present invention will be described in detail on the basis of the drawings. Note that the present invention is not limited by the embodiment. Further, configuration elements in the embodiment include elements that are easy and replaceable by a person skilled in the art, and substantially the same elements.

Figure 1:
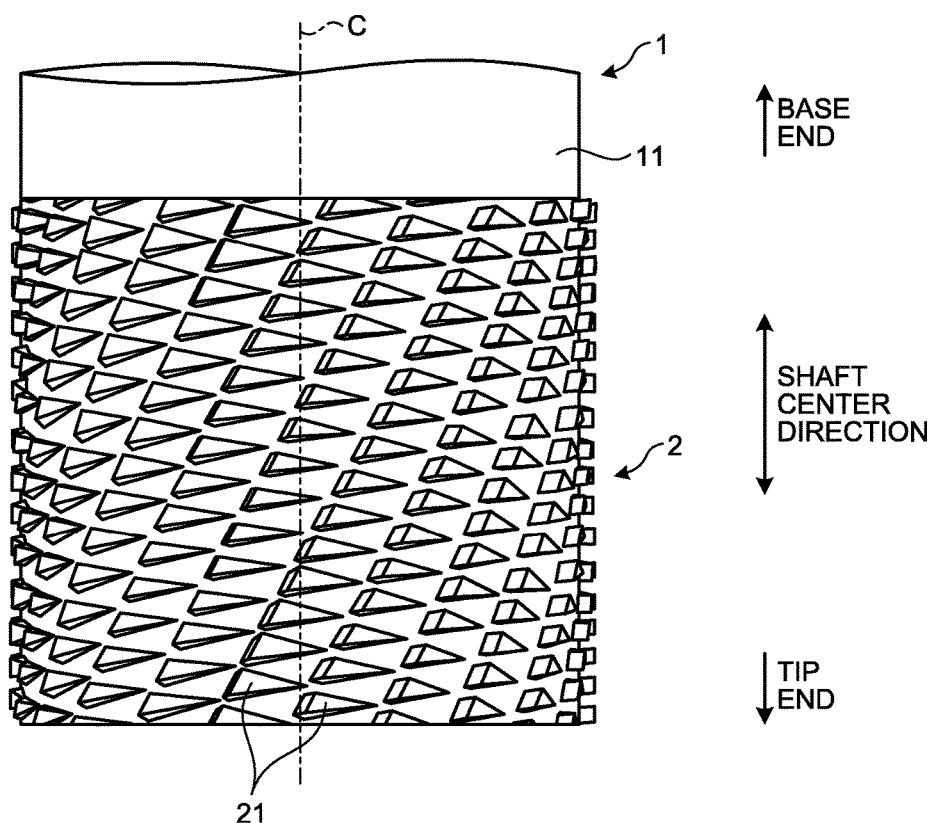
FIG. 1 is a side view of a cutting tool according to an embodiment of the present invention.
Figure 2:
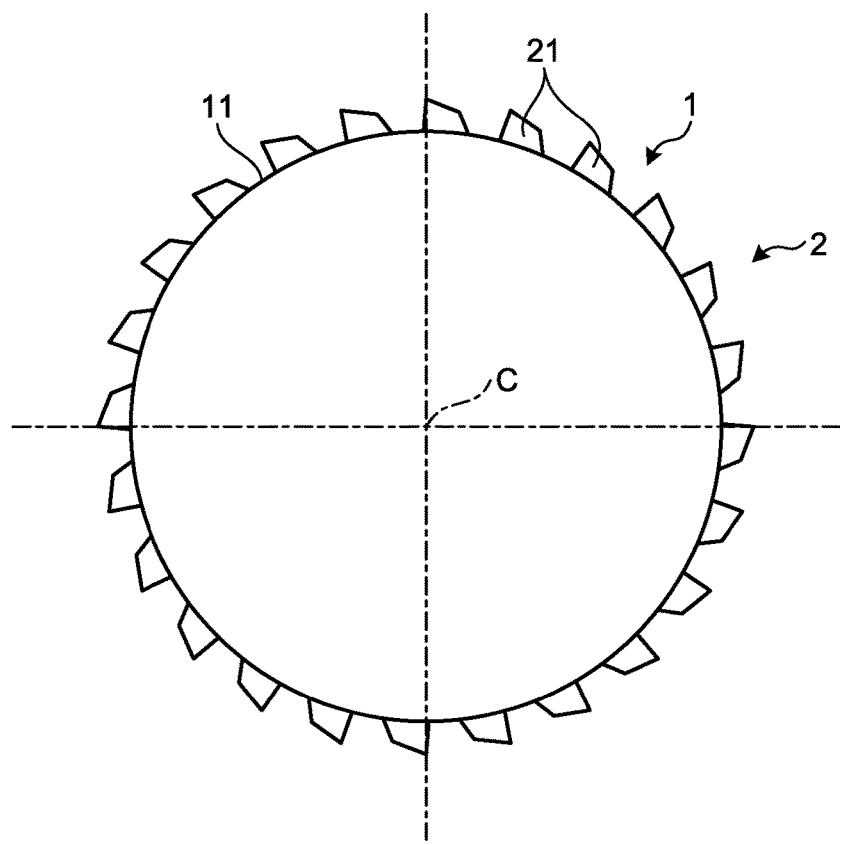
FIG. 2 is a diagram of the cutting tool according to an embodiment of the present invention, as viewed from a tip end side.
Figure 3:
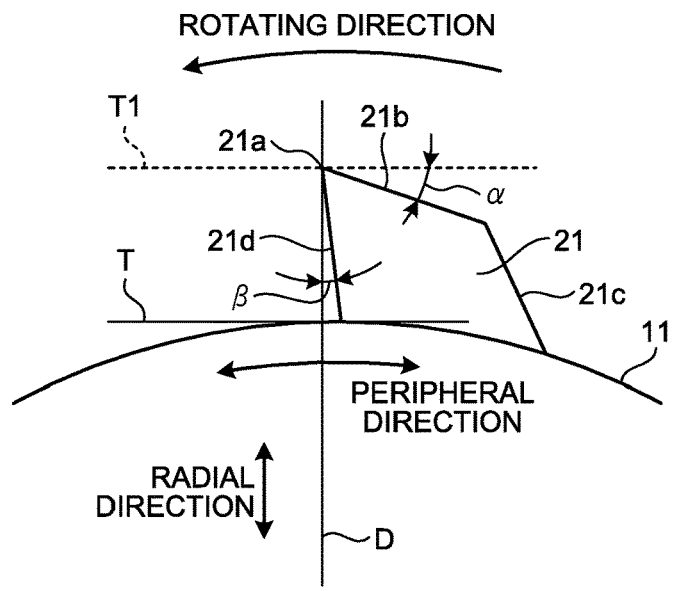
FIG. 3 is an enlarged sectional view of the cutting tool according to an embodiment of the present invention.
Figure 4:
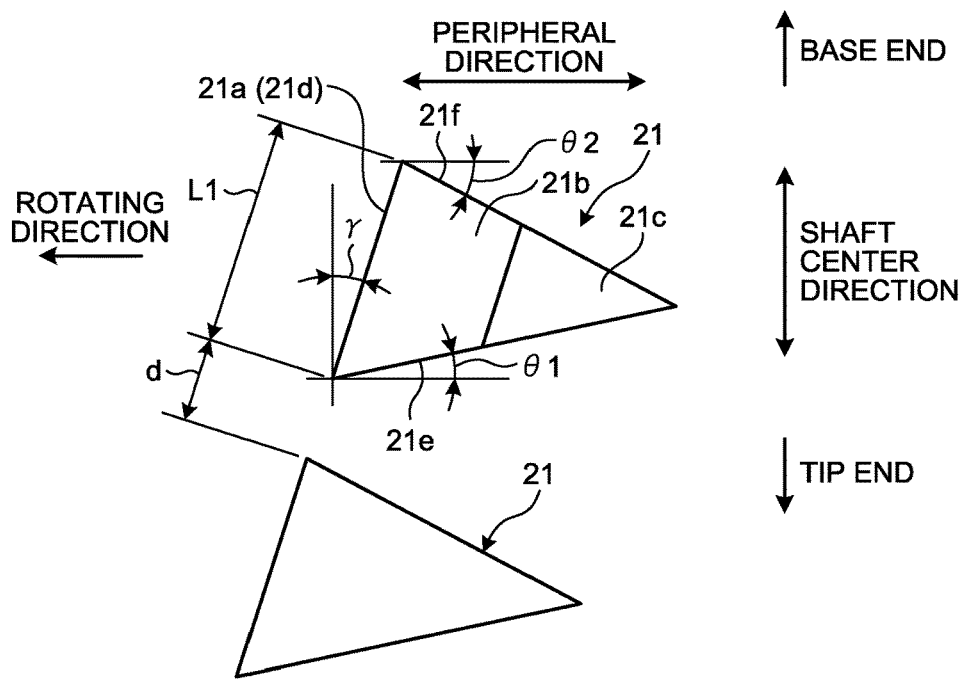
FIG. 4 is an enlarged diagram in side view of the cutting tool according to an embodiment of the present invention.

FIG. 1 is a side view of a cutting tool according to the present embodiment. FIG. 2 is a diagram of the cutting tool according to the present embodiment, as viewed from a tip end side. FIG. 3 is an enlarged sectional view of the cutting tool according to the present embodiment. FIG. 4 is an enlarged diagram in side view of the cutting tool according to the present embodiment.

The cutting tool of the present embodiment is a so-called end mill that performs milling. A material to be machined cut by the cutting tool of the present embodiment is called difficult-to-machine material, and an example includes a nickel-based alloy.

To machine such a difficult-to-machine material as the material to be machined, the cutting tool of the present embodiment is constituted as a tool made of a super hard tool material (tungsten carbide (super hard), cermet, cubic boron nitride (CBN), sintered diamond, ceramics, or the like).

As illustrated in FIGS. 1 and 2, the cutting tool includes a shaft portion 1 and a blade portion 2. The shaft portion 1 is formed into a cylindrical shape. A base end is attached to and supported by a cutting machine (not illustrated) and is rotatably provided, and a tip end side comes in contact with the material to be machined arranged in the cutting machine. The blade portion 2 is provided on a columnar side surface (peripheral surface) of the shaft portion 1 on the tip end side.

The blade portion 2 includes cutting blades 21. The cutting blades 21 are arranged in a plurality of lines on a side surface 11 of the shaft portion 1 along a peripheral direction, and are arranged in a plurality of stages in an extending direction (hereinafter, referred to as shaft center direction) of a shaft center C of rotation of the shaft portion 1 in each line. The line of the cutting blades 21 is not parallel to the shaft center direction, and is arranged to be inclined with respect to the shaft center direction, as illustrated in FIG. 1. The number of lines of the cutting blades 21 is appropriately set according to a material to be cut. In the present embodiment, twenty four lines are arranged along the peripheral direction, as illustrated in FIG. 2. Then, the cutting blades 21 are arranged in the plurality of stages in the shaft center direction of the shaft portion 1 in each line. The number of stages is appropriately set according to the material to be cut.

As illustrated in FIG. 3, each cutting blade 21 has a radial-direction clearance angle $\alpha$ inclined inward in a radial direction from a blade edge 21a with respect to a tangential line T (a virtual line T1 parallel to the tangential line T) of the side surface 11 of the shaft portion 1. A surface making the radial-direction clearance angle $\alpha$ is called radial-direction clearance surface 21b. Note that the radial direction refers to a direction perpendicular to the shaft center C of the shaft portion 1. Inward in the radial direction is a direction toward the shaft center C in the radial direction, and outward in the radial direction is a direction away from the shaft center C. Note that a surface from an end opposite to the blade edge 21a in the radial-direction clearance surface 21b toward the side surface 11 of the shaft portion 1 is called back surface 21c. The back surface 21c is a surface not contributing to cutting.

Further, as illustrated in FIG. 3, each cutting blade 21 has a rake angle β inclined with respect to a radial direction line D (a line extending in the radial direction of the shaft portion 1). A surface forming the rake angle β is called rake surface 21d. The rake surface 21d is a surface from the blade edge 21a toward the side surface 11 of the shaft portion 1, and is a surface facing a rotating direction in the rotation of the shaft portion 1 at the time of cutting.

Further, as illustrated in FIG. 4, each cutting blade 21 has a tip end-side clearance angle θ1 made such that a tip end-side surface 21e facing the tip end side in the shaft center direction is inclined from the blade edge 21a to a base end side with respect to the peripheral direction. Further, as illustrated in FIG. 4, each cutting blade 21 has a base end-side clearance angle θ2 made such that a base end-side surface 21f facing the base end side in the shaft center direction is inclined from the blade edge 21a to the tip end side with respect to the peripheral direction.

Further, as illustrated in FIG. 4, each cutting blade 21 has a torsion angle (lead angle) γ made such that the blade edge 21a (rake surface 21d) is inclined in a direction going from the tip end side to the base end side and reverse to the rotating direction, with respect to the shaft center direction. It has been described that the line of the cutting blades 21 is arranged to be inclined with respect to the shaft center direction, and this inclination corresponds to the torsion angle γ. Note that, as illustrated in FIG. 4, in the blade edge 21a, the length in the shaft center direction from the tip end-side surface 21e to the base end-side surface 21f is a blade length L1.

Figure 6:
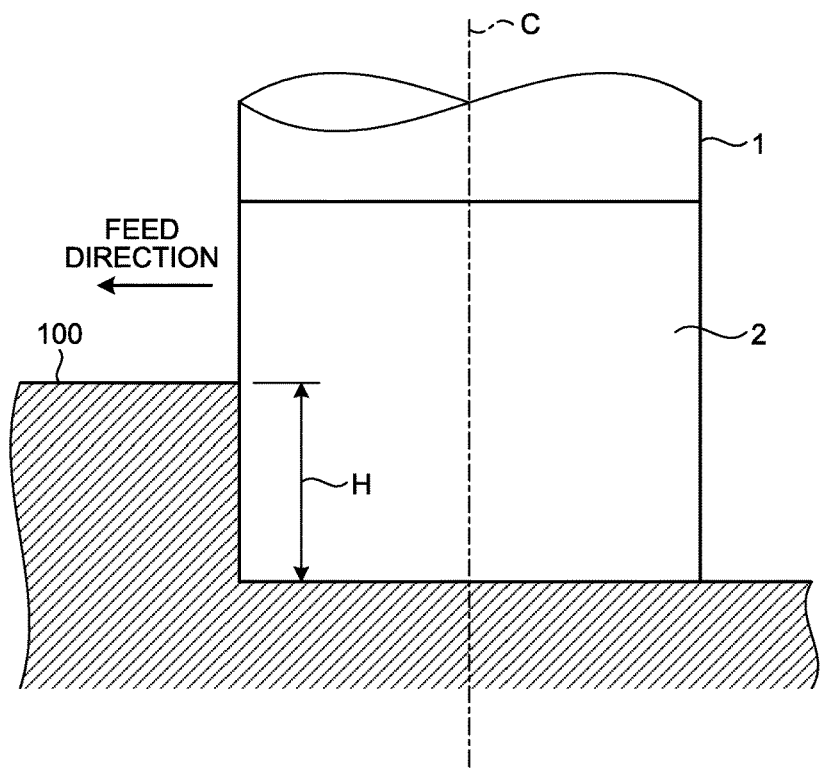
FIG. 6 is a schematic side view illustrating the cutting tool according to an embodiment of the present invention and a material to be machined.

As illustrated in FIG. 6, in the cutting tool of the present embodiment, a set machining height H that is a height to cut a material to be machined 100 is determined. The set machining height H is a set value cuttable when sending the cutting tool in a feed direction in FIG. 6, and is set on the basis of the hardness of the material to be machined 100 and performance of the cutting machine. The cutting tool of the present embodiment is provided with the cutting blades 21 in a plurality of stages within the set machining height H.

As described above, the cutting tool of the present embodiment includes the shaft portion 1 and the blade portion 2 provided on the side surface 11 of the shaft portion 1, and the blade portion 2 includes the cutting blades 21 arranged in the plurality of lines on the side surface 11 of the shaft portion 1 along the peripheral direction, and arranged in the plurality of stages in the shaft center direction of the shaft portion 1 in each line. Then, the cutting blade 21 includes the radial-direction clearance angle α inclined inward in the radial direction from the blade edge 21a with respect to the tangential line T of the side surface 11 of the shaft portion 1, the tip end-side clearance angle θ1 made such that the tip end-side surface 21e facing the tip end side in the shaft center direction is inclined from the blade edge 21a to the base end side with respect to the peripheral direction, and the base end-side clearance angle θ2 made such that the base end-side surface 21f facing the base end side in the shaft center direction is inclined from the blade edge 21a to the tip end side with respect to the peripheral direction.

According to this cutting tool, the cutting blades 21, each of which has the radial-direction clearance angle α, the tip end-side clearance angle θ1, and the base end-side clearance angle θ2, are arranged in the plurality of lines on the side surface 11 of the shaft portion 1 along the peripheral direction and arranged in the plurality of stages in the shaft center direction of the shaft portion 1 in each line, and are provided in a plurality of stages within the range of the set machining height H of the material to be machined 100. Therefore, the cutting amount with the cutting blades 21 can be increased in the cutting machining, and the thermal abrasion and resistance caused in the cutting blades 21 can be decreased with the clearance angles α, θ1, and θ2. In addition, the fine cutting blades 21 are independently arranged on the shaft portion 1. Therefore, the cooling and lubrication with the cutting fluid are facilitated, compared with a periphery of the cutting blades 21. As a result, the tool life can be improved while the machining efficiency can be improved in machining the difficult-to-machine material.

Further, in the cutting tool of the present embodiment, the number of stages A per unit length of the cutting blade 21 favorably falls within a range of A={(L1+d)×Cos γ}/H=from 0.3 to 7.0 stages/mm, both inclusive, where the set machining height of the material to be machined 100 is H, the blade length of the cutting blade 21 is L1, the torsion angle is γ, and a blade groove width on the same torsion line is d.

Note that, as illustrated in FIG. 4, the blade groove width d is a groove width between the cutting blade 21 and another cutting blade 21 adjacent in the shaft center direction on the same torsion line (on a line parallel to the torsion angle γ).

According to this cutting tool, by defining the number of stages A of the cutting blades 21 with respect to the set machining height H of the material to be machined 100, the number of stages A of the cutting blades 21 for remarkably obtaining the effect to increase the cutting amount with the cutting blades 21 and to decrease the thermal abrasion and resistance caused in the cutting blades 21 can be set in cutting the material to be machined 100 having the set machining height H.

Further, in the cutting tool of the present embodiment, the number of lines B of the cutting blades favorably falls within a range of B=360/θ or more, where the cutting speed of the shaft portion 1 is V, a cutting arc length of one blade is L2, and an angle made by rotation of the shaft portion in the case of L2/V<1.0×10$^{-3}$ is θ.

Figure 5:
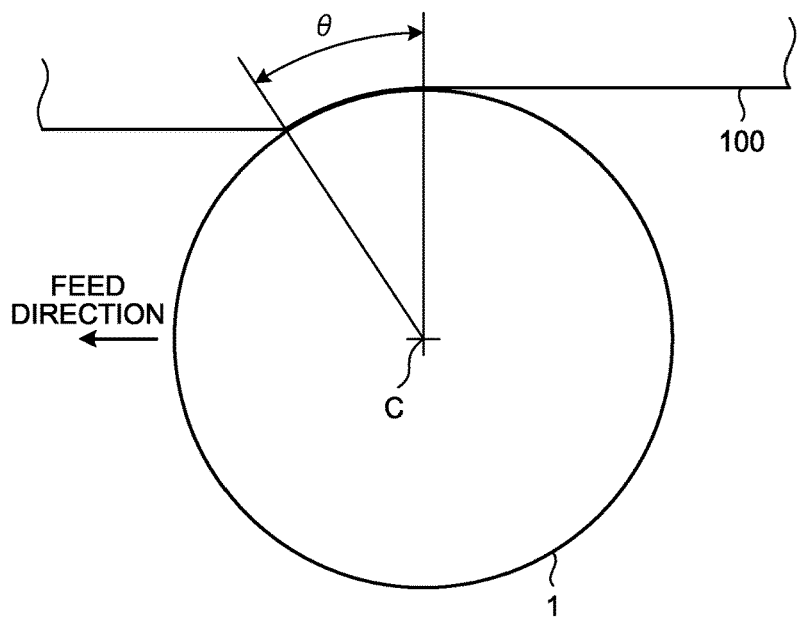
FIG. 5 is a schematic diagram in plan view of the cutting tool according to an embodiment of the present invention.

The angle θ is a rotation angle of the shaft portion 1 of when 1/V<1.0×10$^{-3}$ (s: second) is established where the cutting speed is V (m/s) and the cutting arc length of one blade is L2 (m), and is an angle necessary to be secured to cut the material to be machined 100 with one cutting blade 21, as illustrated in FIG. 5. The number of lines B of the cutting blades 21 is calculated by dividing the whole peripheral angle 360° of the shaft portion 1 by the angle θ.

According to this cutting tool, by defining the number of lines B of the cutting blades 21 with respect to the rotating speed V of the shaft portion 1 and the cutting arc length L2 of one blade, the number of lines B of the cutting blades 21 for remarkably obtaining the effect to decrease the thermal abrasion and resistance caused in the cutting blades 21 can be set in cutting the material to be machined 100 at the rotating speed V of the shaft portion 1 with the cutting arc length L2 of one blade.

Further, in the cutting tool of the present embodiment, the radial-direction clearance angle α of the cutting blade 21 is favorably from 3 to 30 degrees, both inclusive, the tip end-side clearance angle θ1 is favorably from 3 to 15 degrees, both inclusive, and the base end-side clearance angle θ2 is favorably from 3 to 15 degrees, both inclusive.

According to this cutting tool, by defining the radial-direction clearance angle α, the tip end-side clearance angle θ1, and the base end-side clearance angle θ2, the effect to decrease the thermal abrasion and resistance caused in the cutting blades 21 can be remarkably obtained in cutting the material to be machined 100.

Further, in the cutting blade 21 of the cutting tool of the present embodiment, the blade length L1 of the blade edge 21a is favorably from 0.1 to 3.0 mm, both inclusive.

According to this cutting tool, by defining the blade length L1 of the cutting blade 21, the effect to decrease the thermal abrasion and resistance caused in the cutting blade 21 can be remarkably obtained. Further, a hydrostatic pressure of a central portion of the blade length L1 in the blade edge 21a at the time of cutting can be base material strength of the blade portion 2 or less, and effect to decrease damage caused from the center of the cutting blade 21 can be remarkably obtained.

Further, in the cutting tool of the present embodiment, an effective rake angle αe is favorably from 20 to 40 degrees, both inclusive.

Figure 7:
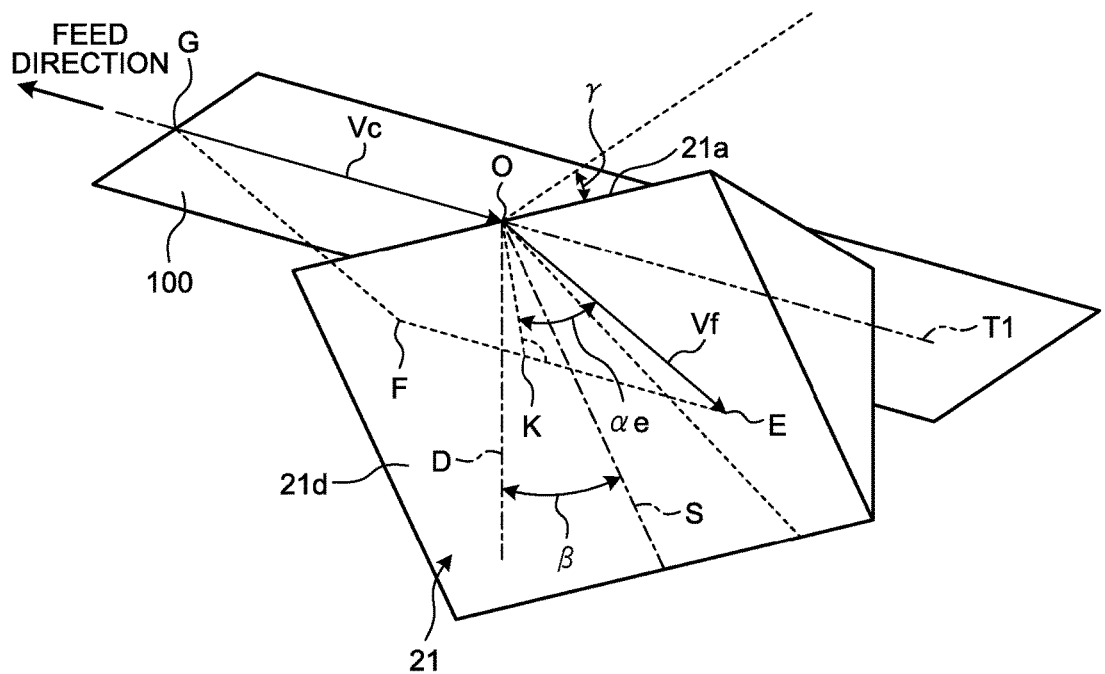
FIG. 7 is an explanatory view of an effective rake angle.

The effective rake angle αe is set as illustrated in FIG. 7. The cutting blade 21 has the rake angle β. The rake angle β in FIG. 7 is an angle made by the radial direction line D (a line extending in the radial direction of the shaft portion 1) based on a point O on the rake surface 21d, and the line segment S goes along the rake surface 21d based on the point O. Further, the cutting blade 21 has the torsion angle γ in the blade edge 21a. In this form, when the blade edge 21a of the cutting blade 21 cuts the material to be machined 100, a reaction force Vc is caused in a reverse direction to the feed direction with respect to the predetermined point O of the blade edge 21a. This reaction force Vc is illustrated by a vector G-O. Then, the cutting blade 21 has an external force Vf in the rake surface 21d due to the reaction force Vc. The external force Vf is illustrated by a vector O-E. The external force Vf is caused to shift with respect to the line segment S of the rake surface 21d by the amount of influence of the torsion angle γ because the blade edge 21a of the cutting blade 21 has the torsion angle γ. A line segment E-F and a line segment F-G parallel to the reaction force Vc and the external force Vf are obtained. A perpendicular line O-K from the point O is obtained with respect to the line segment E-F parallel to the reaction force Vc, of the line segments, and an angle made by the perpendicular line O-K and the external force Vf is the effective rake angle αe. The effective rake angle αe is obtained from a formula $\sin \alpha e = \sin^2 \gamma + \cos^2 \gamma \times \sin \beta$ with the rake angle β and the torsion angle γ. In this way, the effective rake angle αe is formed of the rake angle β and the torsion angle γ.

It is necessary to prevent the blade edge from being chipped due to cutting resistance while securing sharpness, when machining the difficult-to-machine material. According to the cutting tool of the present embodiment as means to solve the above issue, both of the sharpness and the blade edge strength can be obtained by setting the effective rake angle αe formed by the rake angle β and the torsion angle γ to fall within the range from 20 to 40 degrees, both inclusive.

Further, in the cutting tool of the present embodiment, a ratio of the cutting arc length L2 (m) of one blade and the rotating speed V (m/s) of the shaft portion 1 is favorably $L2/V=1.0\times10^{-3}$ (s) or less.

Figure 8:
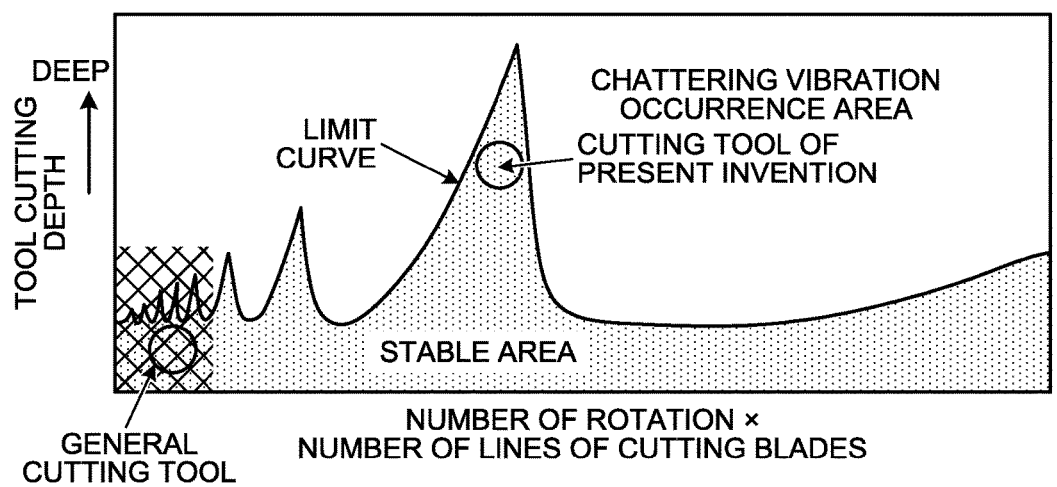
FIG. 8 is a diagram illustrating relationship between the number of rotation of the cutting tool x the number of lines of the cutting blades, and a cutting depth, in chattering vibration.

FIG. 8 is a diagram illustrating relationship between the number of rotation of the cutting tool×the number of lines of the cutting blades, and the cutting depth, in chattering vibration. As illustrated in FIG. 8, in the relationship between the number of rotation×the number of lines of the cutting blades, and the cutting depth, a lower side of a stability limit curve with respect to the cutting depth is a stable area where no chattering vibration occurs, and an upper side of the stability limit curve is an area where the chattering vibration occurs. If the cutting blade 21 of the cutting tool is deeply cut into the material to be machined 100, the chattering vibration is more likely to occur. Therefore, in the general cutting tools, the tool cutting depth cannot be set to be large, and the machining efficiency is not high. Meanwhile, according to the cutting tool (the constitution in which the cutting blades 21 are provided in a larger number of lines than the general tools) of the present embodiment (the present invention), the cutting amount with the cutting blades 21 can be increased and the thermal abrasion and resistance caused in the cutting blades 21 can be decreased using the large stable area without changing the cutting speed. Therefore, by defining the relationship between the cutting arc length L2 of one blade and the rotating speed V of the shaft portion 1, machining can be performed in the stable area where no chattering vibration occurs even if the cutting is made depth. As a result, effect to improve the tool life while improving the machining efficiency can be more remarkably obtained in machining the difficult-to-machine material.

Further, as illustrated in FIG. 1, in the cutting tool of the present embodiment, the stages of the cutting blades 21 are favorably arranged to shift in the shaft center direction in each line of the cutting blades 21 arranged along the peripheral direction of the shaft portion 1.

According to this cutting tool, when the cutting blades 21 are arranged in a plurality of stages in one line, a gap is caused in the shaft center direction between the stages. This gap decreases the thermal abrasion and resistance caused in the cutting blade 21 and thus contributes to improvement of the tool life. However, the gap portion cannot perform machining. Therefore, by shifting and arranging the stages of the cutting blades 21 in the shaft center direction in each line, the cutting blade 21 in another line can be provided in the position of the gap in the peripheral direction. As a result, the cutting machining can be continuously performed in the shaft center direction by the rotation of the shaft portion 1, and thus the machining efficiency can be improved.

REFERENCE SIGNS LIST

1 SHAFT PORTION
11 SIDE SURFACE
2 BLADE PORTION
21 CUTTING BLADE
21a BLADE EDGE
21b RADIAL-DIRECTION CLEARANCE SURFACE
21c BACK SURFACE
21d RAKE SURFACE
21e TIP END-SIDE SURFACE
21f BASE END-SIDE SURFACE
100 MATERIAL TO BE MACHINED
C SHAFT CENTER
L1 BLADE LENGTH
L2 CUTTING ARC LENGTH OF ONE BLADE
T TANGENTIAL LINE
V ROTATING SPEED
α RADIAL-DIRECTION CLEARANCE ANGLE
αe EFFECTIVE RAKE ANGLE
β RAKE ANGLE
γ TORSION ANGLE
θ ROTATION ANGLE OF SHAFT PORTION

θ1 TIP END-SIDE CLEARANCE ANGLE
θ2 BASE END-SIDE CLEARANCE ANGLE

The invention claimed is:

1. A cutting tool, comprising:
a shaft portion; and
a blade portion provided on a side surface of the shaft portion, wherein
the blade portion includes cutting blades arranged in a plurality of lines on the side surface of the shaft portion along a peripheral direction, the cutting blades being arranged in a plurality of stages in an extending direction of a shaft center of the shaft portion in each line,
the cutting blades each have a radial-direction clearance angle inclined inward in a radial direction from a blade edge with respect to a tangential line of the side surface of the shaft portion, a tip end-side clearance angle made such that a tip end-side surface facing a tip end side in the extending direction of the shaft center of the shaft portion is inclined from the blade edge to a base end side with respect to the peripheral direction, and a base end-side clearance angle made such that a base end-side surface facing the base end side in the extending direction of the shaft center of the shaft portion is inclined from the blade edge to the tip end side with respect to the peripheral direction, and
the number of lines B of the cutting blades falls within a range of B = 360/θ or more, where a rotating speed of the shaft portion is V, a cutting arc length of one blade is L2, an angle θ is a rotation angle of the shaft portion when $L2/V < 1.0 \times 10^{-3}$ is established.

2. The cutting tool according to claim 1, wherein
the number of stages A per unit length of each of the cutting blades falls within a range of $A=\{(L1+d) \times \cos\gamma\}/H=$ from 0.3 to 7.0 stages/mm, both inclusive, where a machining height of a material to be machined is H, a blade length of each of the cutting blades is L1, a torsion angle is γ, and a blade groove width on the same torsion line is d.

3. The cutting tool according to claim 1, wherein,
in each of the cutting blades, the radial-direction clearance angle is from 3 to 30 degrees, both inclusive, the tip end-side clearance angle is from 3 to 15 degrees, both inclusive, and the base end-side clearance angle is from 3 to 15 degrees, both inclusive.

4. The cutting tool according to claim 1, wherein,
in each of the cutting blades, a blade length L1 of the blade edge is from 0.1 to 3.0 mm, both inclusive.

5. The cutting tool according to claim 1, wherein,
in each of the cutting blades, an effective rake angle αe is from 20 to 40 degrees, both inclusive.

6. The cutting tool according to claim 1, wherein
the stages of the cutting blades are arranged to shift in the extending direction of the shaft center in each line of the cutting blades arranged along the peripheral direction of the shaft portion.

* * * * *